Oct. 6, 1925.
J. K. OLSEN
1,556,341
COMBINED ODOMETER AND SPEEDOMETER
Filed July 12, 1922    2 Sheets-Sheet 1
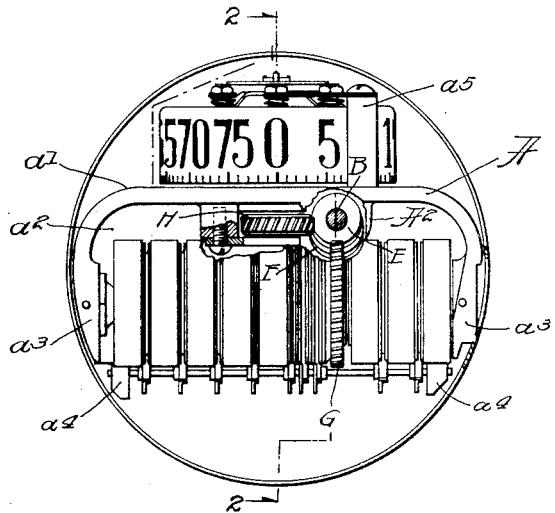
Fig.1.
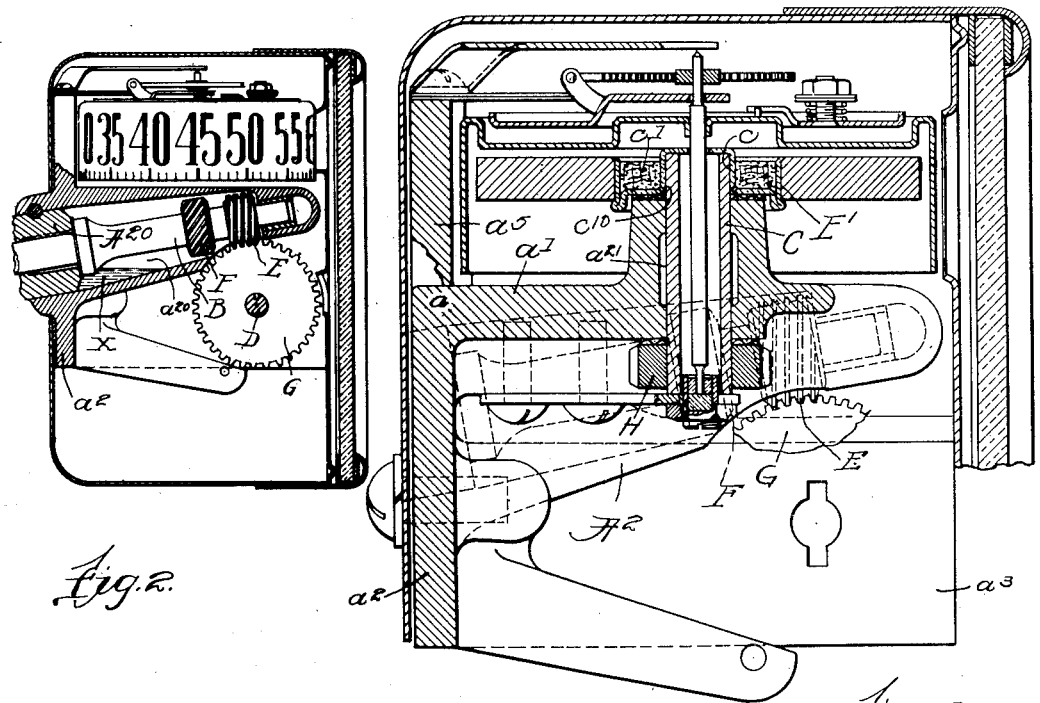
Fig.2.
Fig.3.
Inventor:
John K. Olsen,
by Burton & Burton
his Attys.
Witness:

Oct. 6, 1925.
J. K. OLSEN
1,556,341
COMBINED ODOMETER AND SPEEDOMETER
Filed July 12, 1922    2 Sheets-Sheet 2
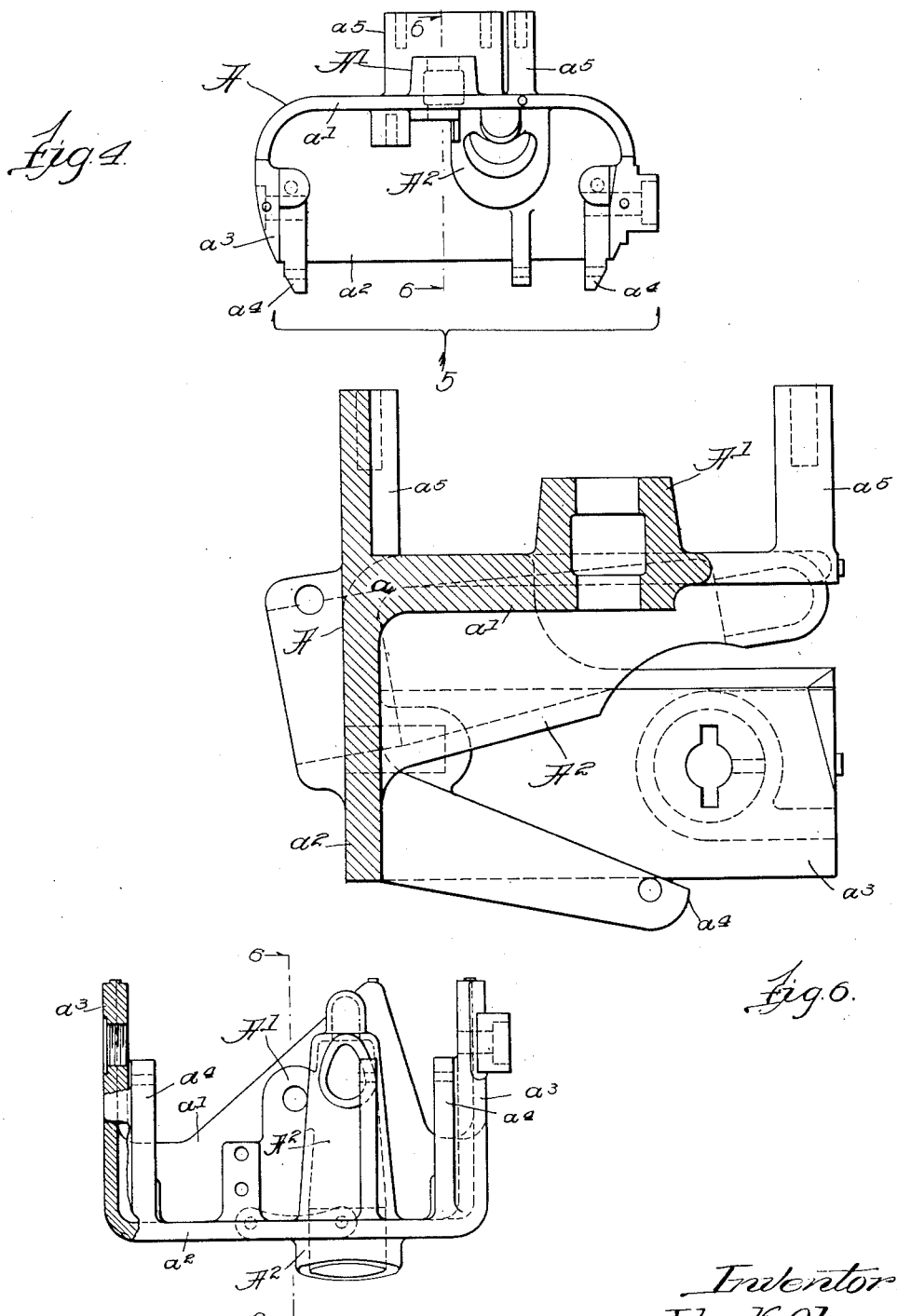

Patented Oct. 6, 1925.

1,556,341

UNITED STATES PATENT OFFICE.

JOHN K. OLSEN, OF CHICAGO, ILLINOIS, ASSIGNOR TO STEWART-WARNER SPEEDOMETER CORPORATION, OF CHICAGO, ILLINOIS, A CORPORATION OF VIRGINIA.

COMBINED ODOMETER AND SPEEDOMETER.

Application filed July 12, 1922. Serial No. 574,523.

*To all whom it may concern:*

Be it known that I, JOHN K. OLSEN, a citizen of the United States, residing in the city of Chicago, in the county of Cook and the State of Illinois, have invented certain new and useful Improvements in Combined Odometers and Speedometers, of which the following is a specification, reference being had to the accompanying drawings, forming a part thereof.

The purpose of this invention is to provide a more economical construction than heretofore commonly employed for combining in one casing and driving from one and the same inleading shaft, a speedometer and an odometer mechanism. It consists in the elements and features of construction shown and described, as indicated in the claim.

In the drawings:—
Figure 1 is a front elevation or face view of a combined instrument embodying this invention with the face plate removed.

Figure 2 is a section at the line, 2—2, on Figure 1, axial with respect to the in-leading power shaft.

Figure 3 is a fore-and-aft section axial with respect to the speedometer magnet shaft, omitting the odometer dials but showing a portion of the odometer gear.
Figure 4 is an elevation of the frame structure looking in a direction at right angles to the speedometer magnet shaft.

Figure 5 is an elevation of the frame structure as seen from the lower forward side, looking in the direction of the magnet shaft axis, being in the direction of the arrow, 5, on Figure 4.

Figure 6 is a section at the line, 6—6, on Figures 4 and 5.
The structure shown in the drawings comprises a unitary or integral,—preferably die-cast,—frame structure, A. This frame comprises a main web, $a$, L-shaped in section axial with respect to the speedometer magnet shaft as seen in Figure 2, comprising horizontal web portions, $a^1$, and vertical web portions, $a^2$. Upon the horizontal web, $a^1$, there is formed a speedometer magnet shaft journal bearing, $A^1$. Projecting forwardly from the vertical web, $a^2$, are brackets or standards, $a^3$, $a^3$, which afford journal bearings for the odometer main shaft, D. Extending obliquely with respect to both webs, $a^1$ and $a^2$, across the right angle between said webs, there is formed the bearing, $A^2$, for the in-leading power shaft B. $a^4$, $a^4$, are bracket arms for carrying the carrying pinion counter shaft of the odometer train. $a^5$, $a^5$ are posts for mounting certain parts of the speedometer mechanism not specifically concerned in the subject matter of this application. It will be observed that the in-leading power shaft, B, journaled in the bearing, $A^2$, has its axis directly transverse,— that is, in a plane at right angles to the axis of the odometer shaft, D, and that the axis of the speedometer magnet shaft, C, is also in a plane at right angles to said odometer shaft, D; and that the vertical plane of the in-leading shaft, B, is offset laterally from the vertical plane (directly transverse to the axis of the shaft, D), of the speedometer magnet shaft, C; and that said shaft, B, is offset laterally above the odometer shaft, D, so that it extends in the angle between the horizontal plane of the shaft, D, and the vertical plane of the shaft, C. The offset distances of the shaft, B, from the axes of the shafts, C and D, respectively, and the distance between the axes of said two shafts, C and D, are such that two gears, E and F, on said in-leading shaft, B, mesh respectively with gears, G and H, on the odometer shaft, D, and the speedometer magnet shaft, C, respectively, as may be clearly understood from Figures 1, 2 and 3. The gear, H, is a worm or spiral gear, the gear, G, being a suitably oblique toothed spur gear for co-operating with said worm gear, and the gears, F and H, are co-operatively formed spiral gears.

The journal bearing member, $A^2$, for the in-leading shaft, B, is large relatively to the diameter of said shaft, and is provided with a bushing, $A^{20}$, which constitutes the immediate journal bearing of said in-leading shaft, B, as clearly seen in Figure 2. The excess diameter of this bushing and of the bearing member $A^2$, for accommodating it, provides a grease chamber, $a^{20}$, in said journal bearing member, $A^2$, in which it is contemplated that the grease will accumulate as indicated at $x$. The speedometer magnet shaft, journaled in the bearing, $A^1$, has the magnet mount, $E^1$, which is secured to its upper end as seen at $c$, formed with an oil chamber, $c^1$, having oil ports, $c^{10}$, at the inner circumference of its bottom and the upper end portion of the bearing of the magnet shaft, C. Upon considering this structure as seen in Figure 3, it will be understood that the lubricant which, reaching the magnet shaft from the oil chamber, $c^1$, flows down along that shaft, may accumulate in the secondary oil chamber, $a^{21}$, which is formed intermediate the ends of the bearings, $A^2$, and that oil creeping or flowing down along the shaft from said secondary chamber, will reach the upper side of the gear, H, and by the rotation of that gear will be thrown out to the teeth of the gear and will lubricate the intermeshing of said gear with the gear, F, on the in-leading shaft, B, and will flow thence into the lower part of the cavity provided into the journal bearing member, $A^2$, as above described, accumulated at $x$, as shown at Figure 2.

It will be seen that the construction described reduces to a minimum the number of shafts and gears necessary for driving a speedometer and odometer in one casing from one and the same in-leading power shaft; and that at the same time there is provided means for lubricating all said shafts from a stored quantity of lubricant, without liability of the lubricant to escape where it may soil any of the parts.

I claim:—

In a combined instrument comprising for deriving movement from the same driving shaft two independently operating mechanisms, in combination, main shafts of the two mechanisms respectively positioned in planes at right angles to each other, the plane of the first mechanism main shaft being offset laterally from the other mechanism main shaft; a driving shaft in common for the two mechanisms positioned crossing both said shafts, a frame having the journal bearings for the three shafts; intermeshing gears on the driving shaft in common and the two main shafts respectively, the journal bearing of said shaft-in-common communicating with the journal bearing of the main shaft of the first mechanism, said main shaft having mounted upon it at its upper end a lubricant container, the journal bearing of the driving shaft-in-common having a lubricant receptacle, said container having flow apertures leading to the journal bearing of the last mentioned main shaft; whereby lubricant may flow from said container to said main shaft bearing and thence to the two intermeshing gears on said main shaft and driving shaft-in-common, respectively, and from the latter of said gears to the journal bearing of said driving shaft-in-common and the receptacle therein.

In testimony whereof, I have hereunto set my hand at Chicago, Illinois, this 5th day of July, 1920.

JOHN K. OLSEN.